Figure 2:
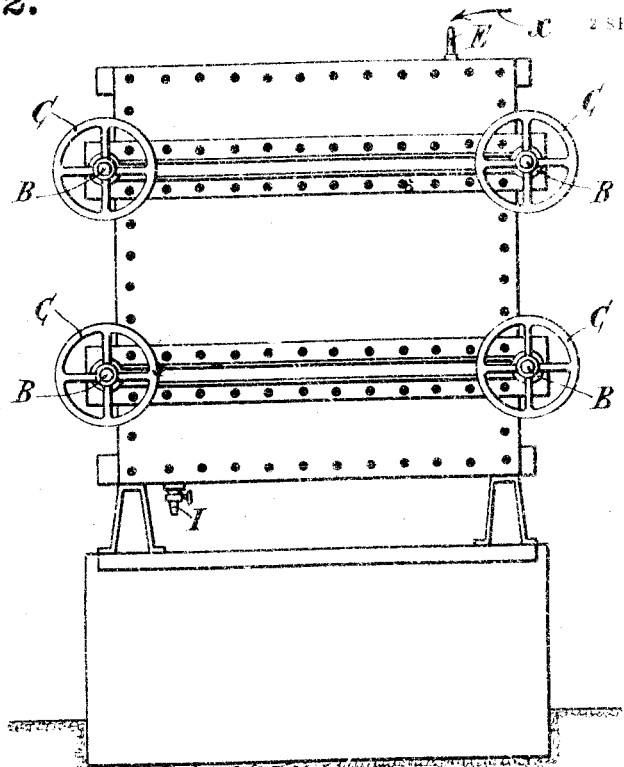

C. P. BARY.
PURIFICATION OF NATURAL AND REGENERATED CAOUTCHOUCS AND OTHER COLLOIDAL MATTERS.
APPLICATION FILED FEB. 3, 1912.
1,136,462.
Patented Apr. 20, 1915.
2 SHEETS—SHEET 1.
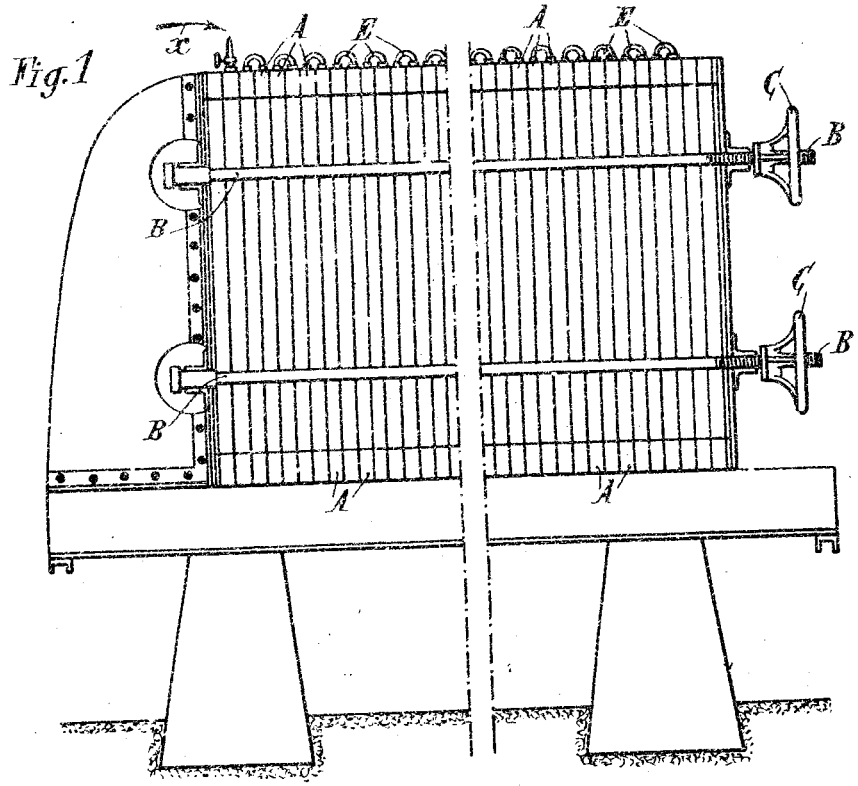
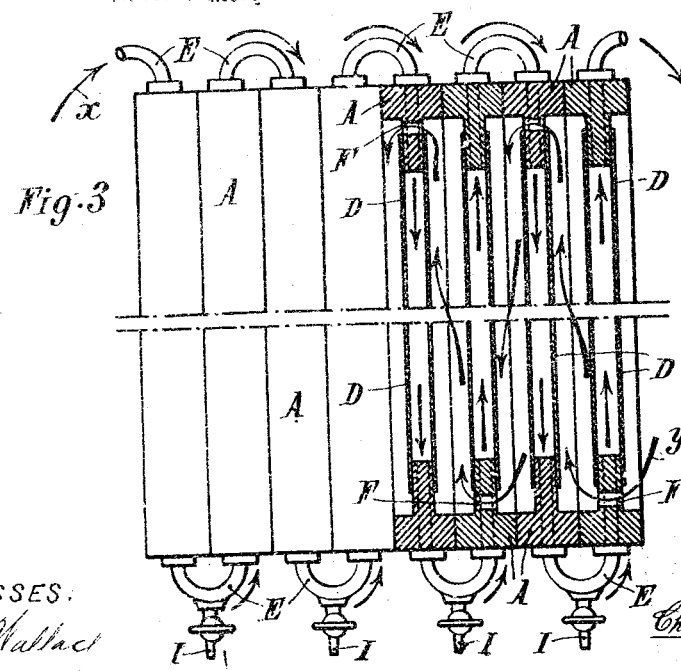
WITNESSES:
INVENTOR:
Charles Paul Bary,
By Attorneys, C. P. BARY.
PURIFICATION OF NATURAL AND REGENERATED CAOUTCHOUCS AND OTHER COLLOIDAL MATTERS.
APPLICATION FILED FEB. 3, 1912.

1,136,462.

Patented Apr. 20, 1915.

2 SHEETS—SHEET 2.

WITNESSES:

INVENTOR:
Charles Paul Bary,
By Attorneys:
Fraser Frink & Myers

UNITED STATES PATENT OFFICE.

CHARLES PAUL BARY, OF PARIS, FRANCE, ASSIGNOR TO HENRY DEBAUGE, OF PARIS, FRANCE.

PURIFICATION OF NATURAL AND REGENERATED CAOUTCHOUCS AND OTHER COLLOIDAL MATTERS.

1,136,462.  Specification of Letters Patent.  Patented Apr. 20, 1915.

Application filed February 3, 1912. Serial No. 675,387.

*To all whom it may concern:*

Be it known that I, CHARLES PAUL BARY, a citizen of the Republic of France, residing in Paris, France, have invented certain new and useful Improvements in the Purification of Natural and Regenerated Caoutchoucs and other Colloidal Matters, of which the following is a specification.

Natural caoutchouc contain more or less foreign matters notably resins. Regenerated caoutchoucs also contain different products such as sulfur and resins which ought to be removed.

The object of this invention is to purify these products by dissolving them in any known solvent for them and subjecting this solution to dialysis. The solvents which can be used for treating caoutchouc in this manner are notably benzene, toluene, xylene, light petroleum, carbon bisulfid, carbon tetrachlorid, chloroform, tetrachlorethane, terpene hydrocarbons or the like.

This invention is applicable in a general manner to the treatment of colloidal solutions for removing from them dissolved crystalloids.

It has been observed that when the two faces of a sheet of vulcanized caoutchouc are in contact, one with a solution of sulfur in a hydrocarbon and the other with the hydrocarbon alone, the sulfur passes through the membrane by osmosis, and tends to establish an equilibrium of osmotic pressure on the two sides of the dialyzer; by renewing in regular manner the pure hydrocarbon it is thus possible to extract in this manner from the solution practically the whole of the sulfur which it contains. It is the same with resins and certain other foreign matters contained in the caoutchouc and there is obtained a solution which no longer contains an appreciable quantity of caoutchouc.

The membranes of vulcanized caoutchouc behave in contact with the hydrocarbons and the bodies which are dissolved in them like semi-permeable membranes, that is to say they allow the dissolved bodies to diffuse in the manner of crystalloids and retain bodies dissolved in the manner of colloids.

A membrane of caoutchouc is not the only surface by aid of which the purification by dialysis of a solution of a matter in a hydrocarbon can be effected; experiments which have been made show that when other semi-permeable surfaces are used, such as terra-cotta, asbestos card or paper, or sufficiently close fabrics, these surfaces become filled or saturated, their pores obstruct the colloidal matters in the solution and become filled thereby so that it is only the permeability of these colloidal matters thus held in the support which gives rise to the dialytic action on the solution to be purified.

Caoutchouc being the substance most permeable for the dialysis of matters soluble in hydrocarbons, one may apply it in the state of a membrane, or use its dialytic action when it fills the pores of porous surfaces or supports. When sheets of vulcanized caoutchouc are used they would become too fragile, being swollen by the hydrocarbons. They are reinforced by arranging them between two cotton cloths or metal cloths which serve to support them. The caoutchouc membranes and their cloth supports are fixed by gelatin glue on frames of wood or other material.

Instead of sheets of caoutchouc one may use suitable resistance surfaces insufficiently porous to allow a simple filtration, but sufficiently so for the total surface of the pores to form a considerable surface adapted for diffusion.

The accompanying drawings show by way of example apparatus for the industrial realization of the process which is in this case supposed to be applied to the treatment of caoutchouc.

Figure 4:
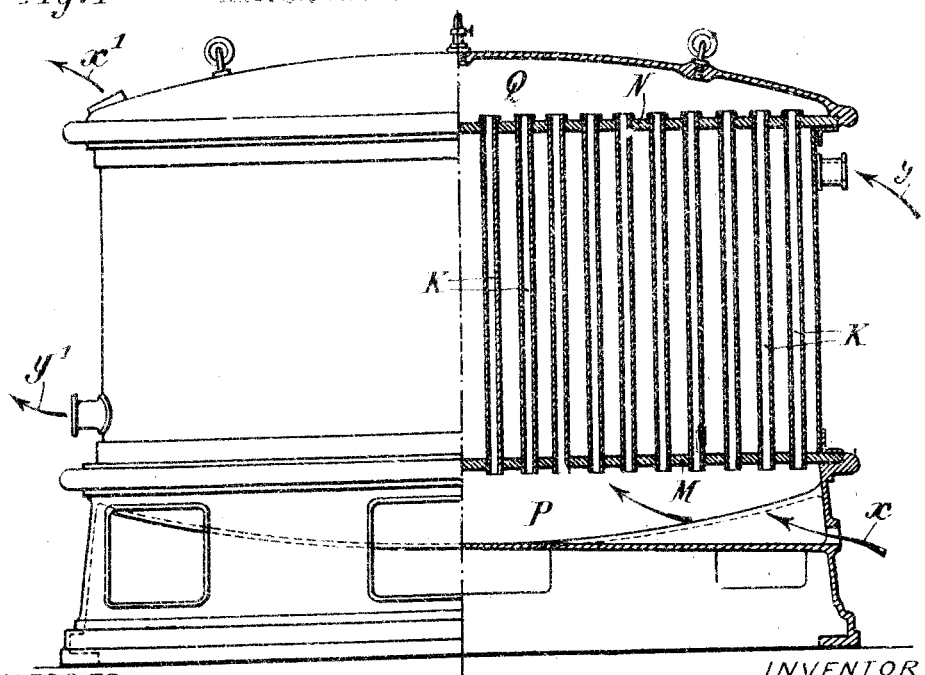

Figures 1 to 3 show an arrangement which is suitable when the diffusion is effected through vulcanized caoutchouc membranes or asbestos paper, or, generally speaking, porous materials in sheets or flat layers. Fig. 1 is a side elevation; Fig. 2 is an end elevation; Fig. 3 shows a detail drawn to an enlarged scale; Fig. 4 shows in longitudinal sectional elevation a modification which is an example of the application of porous tubes.

The apparatus shown in Figs. 1-3 consists of a certain number of plates or frames A of wood or other material, arranged contiguously with each other and held together so that the joints between them are tight by means of screw bolts B and nuts C. The whole apparatus recalls the arrangement of the filter press.

As shown in the detail in Fig. 3, each frame A carries two membranes D, D of caoutchouc, asbestos or other suitable material having between them a space in which is to circulate, for example, the solution to be freed from foreign substances dissolved with the colloid. The spaces between these plates communicate with each other by pipes E which connect the spaces alternately at the top and at the bottom. By grouping the two neighboring plates there remain other empty spaces between the membranes belonging to different plates. These latter spaces communicate with each other through perforations F, F in the frames and serve for circulation of the liquid which is to receive the substances diffused through the membranes D, D.

When the object is to remove from solutions of caoutchouc the sulfur which they contain, for example if the solution of caoutchouc is introduced into the apparatus in the direction of the arrow $x$ (Fig. 3) the solvent should enter in the direction of the arrow $y$ so that the movement of the two liquids on each side of the membrane D, D should bring about as much as possible a systematic extraction.

Should an accident occur to one of the membranes, which accident would be immediately observed at the delivery end owing to the partial mixing of the two liquids, the damaged part can be detected for the purpose of dismounting and repairing it by tests made on samples withdrawn through the cocks I in the lower connecting pipes E.

In the modification shown in Fig. 4, the porous surfaces are tubes K of porous material arranged between two tube plates N M, which constitute the bottom and top respectively of chambers Q and P. The solution of caoutchouc enters as indicated by arrow $x$, rises through the tubes and leaves at $x'$, while the solvent enters at $y$ and leaves at $y'$.

It is to be remarked that the exchanges which occur between the liquids on each side of the membrane do not produce differences of hydrostatic pressure but only differences of osmotic pressure and that in consequence what happens is in no way comparable with a simple filtration.

By way of example of the treatment of another material than caoutchouc it may be mentioned that a colloidal solution of acetyl cellulose in tetrachlorethane and containing dissolved crystalloid substances, such as hexachlorethane, may be freed from the latter by using membranes of caoutchouc or porous materials as has been hereinbefore explained.

Having thus described my invention and the best means I know of carrying the same into practical effect, I claim:—

1. A process of purifying caoutchouc, which comprises subjecting a solution of caoutchouc containing impurities, to dialysis.

2. A process of purifying caoutchouc, which comprises circulating a solution of caoutchouc containing impurities, on one side of a dialyzing membrane, and circulating a solvent on the other side of said dialyzing membrane, whereby impurities are separated from said solution of caoutchouc by dialysis.

3. A process of purifying caoutchouc, which comprises circulating a solution in hydrocarbon of caoutchouc containing impurities on one side of a dialyzing membrane, and circulating the pure hydrocarbon solvent on the other side of said dialyzing membrane.

4. A process of purifying caoutchouc, which comprises circulating a solution of caoutchouc containing impurities on one side of a dialyzing membrane, and circulating a solvent on the other side of said dialyzing membrane in a reverse direction, whereby impurities are separated from said solution of caoutchouc by dialysis.

5. A process of purifying caoutchouc, which comprises subjecting a solution of caoutchouc containing impurities to dialysis through a caoutchouc membrane.

6. An apparatus for purifying caoutchouc, comprising a liquid container and a dialyzing membrane in said container adapted to separate a solution to be purified from a solvent in said container, whereby dialysis may take place through said membrane, said membrane comprising caoutchouc.

7. An apparatus for purifying caoutchouc, comprising a liquid container and a dialyzing membrane in said container adapted to separate a solution to be purified from a solvent in said container, whereby dialysis may take place through said membrane, said membrane comprising caoutchouc and porous supports for said caoutchouc.

8. An apparatus for purifying caoutchouc, comprising a liquid container and a dialyzing membrane in said container adapted to separate a solution to be purified from a solvent in said container, whereby dialysis may take place through said membrane, said membrane comprising porous material impregnated with caoutchouc.

9. An apparatus for purifying caoutchouc, comprising a frame having dialyzing diaphragms therein, said diaphragms comprising caoutchouc and adapted to separate a solution between them from a solution on the outside of said diaphragms.

In witness whereof, I have hereunto signed my name in the presence of two subscribing witnesses.

CHARLES PAUL BARY.

Witnesses:
H. C. COXE,
RENÉ BARDY.